UNITED STATES PATENT OFFICE.

PAUL THEODOR SIEVERT, OF DRESDEN, GERMANY.

MANUFACTURE OF SHEET-GLASS.

SPECIFICATION forming part of Letters Patent No. 676,612, dated June 18, 1901.

Application filed January 4, 1900. Serial No. 386. (No specimens.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in the Manufacture of Sheet-Glass, of which the following is a specification.

In the manufacture of sheet-glass, hitherto performed by the casting process, the pouring out of the liquid glass was generally followed by the stretching out of the liquid glass and by the smoothing down of the same by means of rollers or such like mechanical means. In order to do away with such mechanical means, and thereby obviating the not-desired effect of such means on the glass surfaces, I carry out the process of manufacturing glass sheets in such manner that the plate or table upon which the liquid glass is poured receives a shaking motion, by which the spreading out of the glass mass will take place to the desired extent and thickness. This shaking motion may be imparted to the plate or table in all directions. It may take place in a vertical direction (or, in other words, a direction perpendicular to that in which the sheet is to be spread) or else in a horizontal direction or parallel with the direction in which the sheet is to be spread, or it may take place in both vertical and horizontal directions. The horizontal table or plate may be provided with a vertical rim in order to prevent running off of the liquid glass or sliding off of the spread-out glass layer.

The plate or table may be made of metal or of any suitable material. I preferably make such plate or table of a material of very inferior capacity for conducting heat—such, for instance, as wood, asbestos, or refractory clay—because such material will advantageously retard the solidifying of the liquid mass.

The plate or table may be a hollow one with perforation or perforations on its upper surface. Upon this plate or table a layer of fibrous material may be placed to receive the molten glass and to be kept moist. The hollow space in the plate or table may be filled with water, which by the shaking motion of the plate or table keeps the fibrous layer on it constantly moist. The moist surface of such fibrous layer will materially reduce all indents upon the under side of the glass, which indents may occur by the liquid glass mass resting silently on a dry surface.

The shaking motion of the plate or table may be effectuated by hand or by known mechanical means.

In carrying out the process I proceed by setting the plate or table into shaking motion or imparting said motion to the said surface, and thereafter I pour liquid glass upon the same. The quantity of such liquid glass has to be chosen according to the extent and thickness of the glass sheet to be produced. The shaking motion is continued until the liquid glass is completely smoothed down, and after the glass has solidified the sheet will present a perfect smooth surface with its natural fire polish.

In some cases I prefer to put upon the rim of the plate or table a second plate, also of a non-conducting material. This second plate is brought up after the pouring out of the liquid glass. The upper plate may be held in position by fillets or by any other suitable means. Against this second plate the glass mass in its spreading-out process will be dashed if it is jumping up by the shaking motion.

I claim—

1. The process herein described of manufacturing glass sheets having a flat surface, consisting in subjecting liquid glass, after being poured out, to a shaking motion for the purpose of spreading out the liquid glass to the desired extent and thickness.

2. The process herein described of manufacturing sheet-glass consisting in the spreading of a mass of liquid or plastic glass into a sheet by subjecting the mass to a shaking motion in a direction perpendicular to that in which the mass is to be spread.

3. The process herein described of manufacturing sheet-glass consisting in the spreading of a mass of liquid or plastic glass into a sheet by subjecting the mass to a shaking motion in a direction parallel with that in which the sheet is to be spread.

4. The process herein described of manufacturing sheet-glass consisting in the spreading of a mass of liquid or plastic glass into a sheet by subjecting the mass to a shaking motion both in vertical and horizontal directions.

5. The process herein described of manufacturing sheet-glass which consists in spreading a mass of liquid or plastic glass into a sheet by subjecting said mass to a shaking motion while exposed at its under surface to moisture.

In testimony that I claim the foregoing as my invention I have signed my name, in presence of two witnesses, this 15th day of December, 1899.

PAUL THEODOR SIEVERT.

Witnesses:
  WILHELM WIESENHÜTTER,
  WENZEL ZENKER.